(12) United States Patent
Eberlein et al.

(10) Patent No.: US 10,120,886 B2
(45) Date of Patent: Nov. 6, 2018

(54) DATABASE INTEGRATION OF ORIGINALLY DECOUPLED COMPONENTS

(71) Applicant: SAP SE, Walldorf (DE)

(72) Inventors: Peter Eberlein, Malsch (DE); Volker Driesen, Heidelberg (DE)

(73) Assignee: SAP SE, Walldorf (DE)

( * ) Notice: Subject to any disclaimer, the term of this patent is extended or adjusted under 35 U.S.C. 154(b) by 523 days.

(21) Appl. No.: 14/798,461

(22) Filed: Jul. 14, 2015

(65) Prior Publication Data

US 2017/0017669 A1    Jan. 19, 2017

(51) Int. Cl.
*G06F 17/30* (2006.01)

(52) U.S. Cl.
CPC .. *G06F 17/30292* (2013.01); *G06F 17/30569* (2013.01)

(58) Field of Classification Search
CPC ............. G06F 17/30292; G06F 17/30569
USPC .................................................. 707/803
See application file for complete search history.

(56) References Cited

U.S. PATENT DOCUMENTS

| | | | | |
|---|---|---|---|---|
| 6,012,067 A * | 1/2000 | Sarkar | ............... | G06F 17/30861 |
| 7,296,028 B1 * | 11/2007 | Ivanova | ............... | G06F 8/74 |
| 9,679,037 B2 * | 6/2017 | Srinivasan | ........... | G06F 17/30575 |
| 2004/0064456 A1 * | 4/2004 | Fong | .................. | G06F 17/30592 |
| 2004/0250238 A1 * | 12/2004 | Singh | ......................... | G06F 8/30 |
| | | | | 717/108 |
| 2005/0154708 A1 * | 7/2005 | Sun | ..................... | G06F 17/30575 |
| 2006/0031243 A1 * | 2/2006 | Boyle | .................. | G06F 17/3056 |
| 2007/0198577 A1 * | 8/2007 | Betz | ..................... | G06F 17/30336 |
| 2008/0098046 A1 * | 4/2008 | Alpern | ............... | G06F 17/30306 |
| 2008/0162509 A1 * | 7/2008 | Becker | .............. | G06F 17/30575 |
| 2009/0182756 A1 * | 7/2009 | Kang | ................. | G06F 17/30306 |
| 2010/0082549 A1 * | 4/2010 | Hollingsworth | .... | G06F 17/3056 |
| | | | | 707/665 |
| 2011/0145210 A1 * | 6/2011 | Rathinam | .......... | G06F 17/30997 |
| | | | | 707/705 |
| 2014/0067868 A1 * | 3/2014 | Kemmler | ........... | G06F 17/30294 |
| | | | | 707/796 |
| 2014/0172788 A1 * | 6/2014 | Haase | ..................... | G06Q 10/06 |
| | | | | 707/610 |
| 2014/0365436 A1 * | 12/2014 | Calienes | ........... | G06F 17/30581 |
| | | | | 707/620 |
| 2014/0372374 A1 * | 12/2014 | Bourbonnais | ..... | G06F 17/30578 |
| | | | | 707/613 |
| 2015/0106140 A1 * | 4/2015 | Biewald | ............. | G06Q 10/0631 |
| | | | | 705/7.12 |
| 2015/0293969 A1 * | 10/2015 | Aakolk | ................... | G06Q 10/00 |
| | | | | 707/802 |
| 2016/0210342 A1 * | 7/2016 | Vallabhaneni | .... | G06F 17/30575 |
| 2017/0300390 A1 * | 10/2017 | Dornemann | ........ | G06F 11/1464 |

* cited by examiner

*Primary Examiner* — Boris Gorney
*Assistant Examiner* — Tiffany Thuy Bui
(74) *Attorney, Agent, or Firm* — Buckley, Maschoff & Talwalkar LLC

(57) ABSTRACT

A first component originally has a persistency decoupled from a persistency of a second component. The second component requires a table from the persistency of the first component. The first component is assigned a first database schema and the second component is assigned a second database schema. A table link is created in the second database schema of the second component, wherein the table link refers to the required table from the first database schema of the first component.

16 Claims, 9 Drawing Sheets

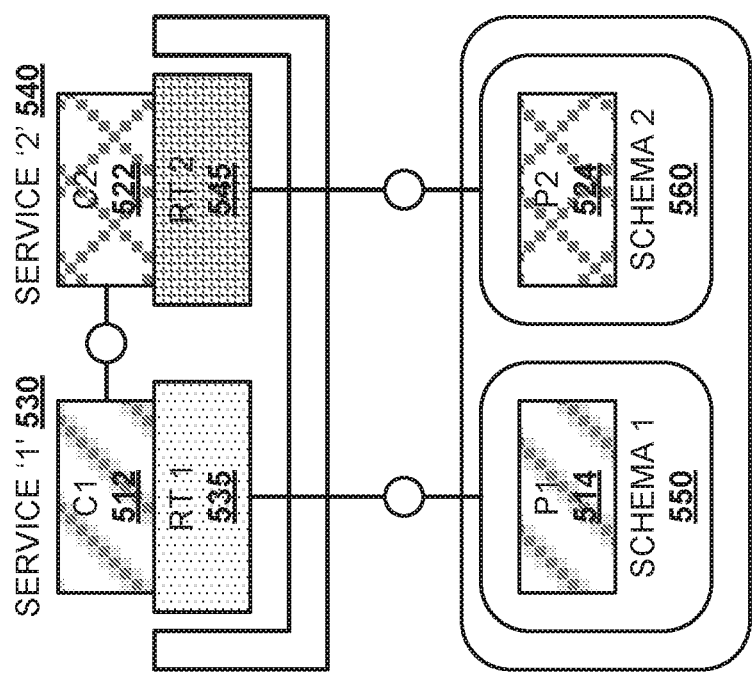
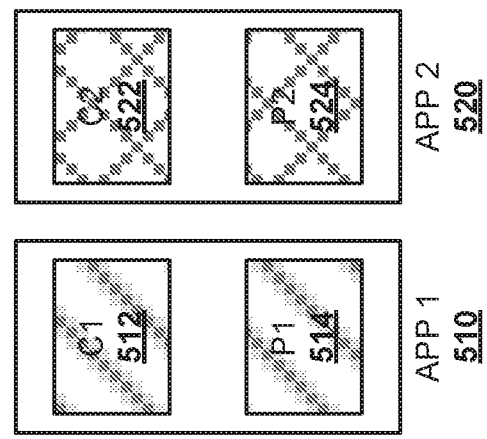
FIG. 5

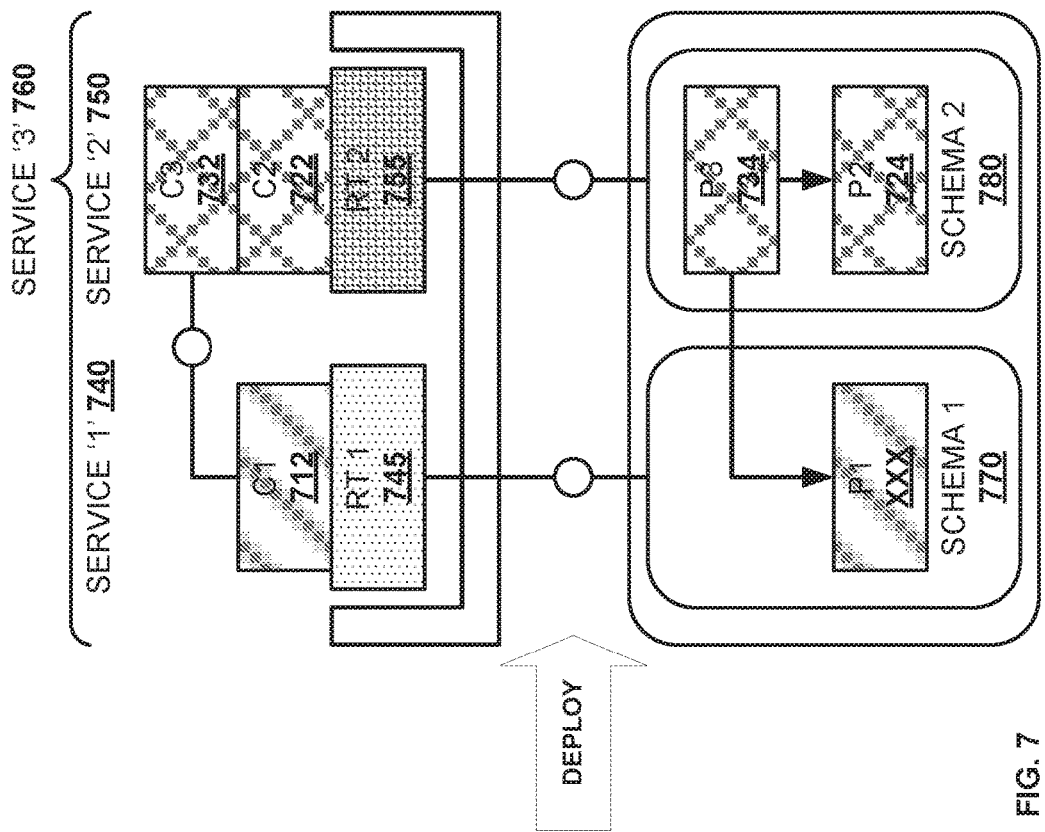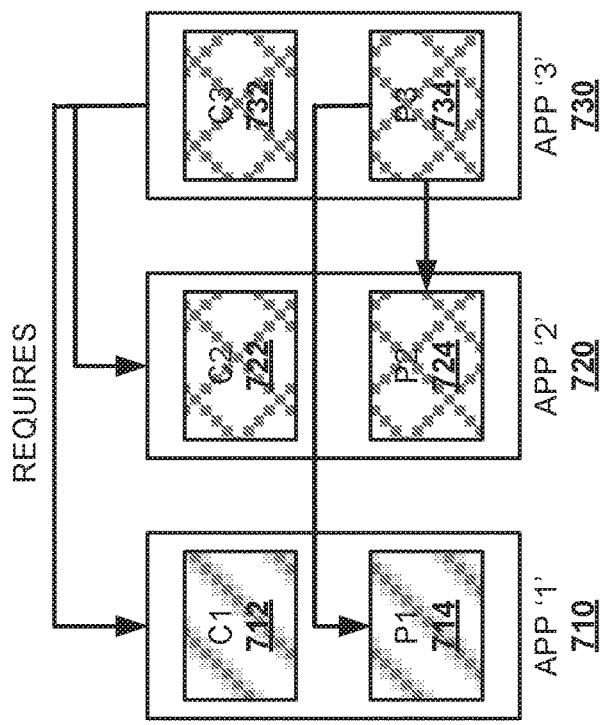
FIG. 7

DATABASE INTEGRATION OF ORIGINALLY DECOUPLED COMPONENTS

BACKGROUND

A complex application such as a server-side enterprise application may have to support a variety of different clients including desktop browsers, mobile browsers and native mobile applications. The application might also expose application programming interfaces for third parties to consume. It might also integrate with other applications, for example, via either web services or message brokers. As such, the application may have to consist of different types of components corresponding to different functional areas of the application. For example, logical components of the application may include presentation components, business logic components, database access logic, application integration logic, etc. Another requirement may be that different teams may be working on the application. Further, continuous deployment of the different components of the application may be desired. Multiple copies of the application may need to be run on multiple machines to satisfy scalability and availability requirements. Different technologies such as frameworks, programming languages, etc., may be more suitable for different components of the application.

An example of software architecture design pattern for such complex applications is a design pattern based on micro-service architecture. According to the micro-service architecture, complex applications are composed of small, independent processes communicating with each other using language-agnostic application programming interfaces. These services have limited scope, focused on performing a small task and are highly decoupled from one another.

BRIEF DESCRIPTION OF THE DRAWINGS

The claims set forth the embodiments with particularity. The embodiments are illustrated by way of examples and not by way of limitation in the figures of the accompanying drawings in which like references indicate similar elements. The embodiments, together with its advantages, may be best understood from the following detailed description taken in conjunction with the accompanying drawings.

FIGS. 5-8 illustrate deployment orchestration for various combinations of services integrated on the database level.

DETAILED DESCRIPTION

Figure 1:
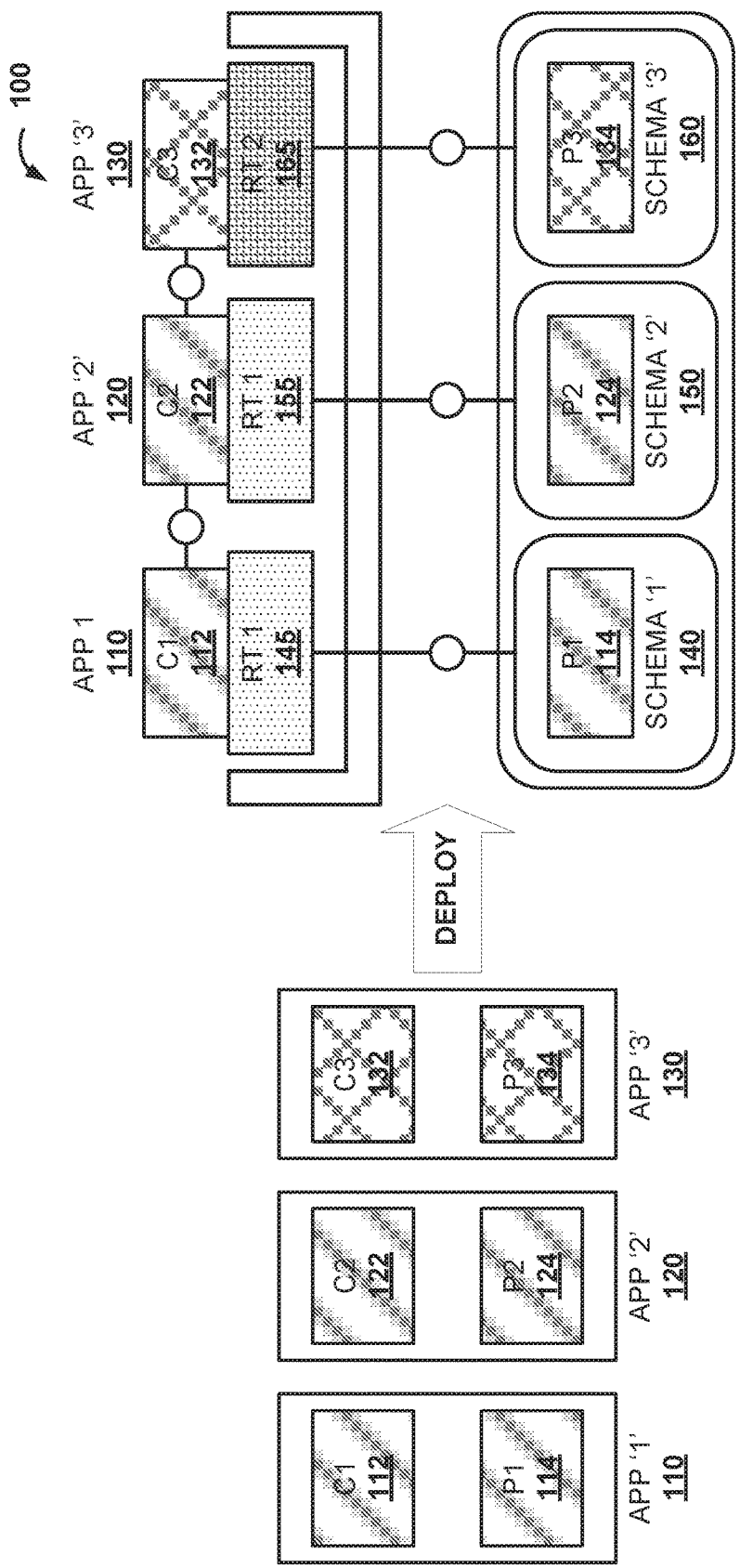
FIG. 1 illustrates different applications that require different runtimes and different database schemas, according to one embodiment.

Embodiments of techniques for database schema management of micro service applications are described herein. In the following description, numerous specific details are set forth to provide a thorough understanding of the embodiments. One skilled in the relevant art will recognize, however, that the embodiments can be practiced without one or more of the specific details, or with other methods, components, materials, etc. In other instances, well-known structures, materials, or operations are not shown or described in detail.

Reference throughout this specification to "one embodiment", "this embodiment" and similar phrases, means that a particular feature, structure, or characteristic described in connection with the embodiment is included in at least one of the one or more embodiments. Thus, the appearances of these phrases in various places throughout this specification are not necessarily all referring to the same embodiment. Furthermore, the particular features, structures, or characteristics may be combined in any suitable manner in one or more embodiments.

Micro-service architecture of a composite application supports independent patching, deployment and upgrade of the micro services. A micro-service (or hereinafter "a service") may be a computer module that performs a specific task within a more complex computer application. A composite application may be a computer application composed of different components or micro-services to be run on different runtimes, according to one embodiment. A service may be composed of or include one or more components or micro-services from one or more applications. In one embodiment, for the different services different runtimes may be provisioned, depending on which type of runtime is suitable to provide execution environment for the task performed by the corresponding service. For example, depending on the data that is persisted and is used by the corresponding service such as streaming data, internet of things data, administrative data, etc.

It is typical for composite applications, which are composed of multiple components such as micro-services, to integrate with one another via communication among the components or services. The communication among the services is typically performed by a router via Hypertext Transfer Protocol (HTTP) connections. The router is a single entry point to the composite applications from client systems such as browsers. The router receives incoming access requests to the composite application and dispatches the requests among the micro-services of the composite application.

The components or micro-services of composite applications are isolated and, typically, lack integration on persistency or database level according to design patterns of the micro-service architecture. In one embodiment, components or micro-services of composite applications are integrated on the persistency or database level. The components or micro-services of composite applications may be integrated on the database level to allow in-memory execution of stored procedures or other computations performed by, for example, an in-memory database. Computations such as join operations are performed in-memory by the in-memory database to optimize runtime and data volume, which is to be transferred and processed in an application server. An example of an in-memory database may be SAP HANA provided by SAP SE. For procedures to be executed in-memory may require integration of composite applications on the database level. However, integration of composite applications on the database level instead of on the service level creates deployment dependencies, among other challenges, that are typically absent in the original micro-service architectures, A persistency may refer to a collection that includes a set of tables, views, stored procedures, triggers, calculation views, analytical views, calculation views and other database objects. The persistency may be associated with a corresponding service or an application, which consume the persistency. When tables or views are included in the same database, typically, names of the tables or views have to be aligned to avoid name collisions. According to one embodiment, the persistency of each service is assigned a corresponding database schema to prevent clashing of names in the database. Thus, different services are assigned individual database schemas to integrate the services on the database level without name collisions. Since the tables are isolated by the assigned database schema, each service can generate tables with names that do not collide with names of tables of other services. Table names have unique table addresses based on the schema. For example, the schema name in the table address: "<schema_name>. <table_name>" provides name spaces for tables within the scope of the corresponding schema. This creates isolation of the tables and views of a particular schema because if service 'A' calls table 'X' and another service 'B' calls table 'X', there is no name clash since both service 'A' and 'B' are having a version of table 'X'.

FIG. 1 illustrates different applications 100-130 that require different runtimes and different database schemas, according to one embodiment. Different applications may manage persistency based on different frameworks with corresponding naming conventions. Exemplary persistency frameworks for various applications may include Java Persistency Architecture, Business Object Persistency Framework, Rails, etc.

Application '1' 110 is a composite application that manages persistency with corresponding persistency 'P1' 114. Application '1' 110 includes at least component 'C1' 112. Similarly, application '2' 120 is a composite application that includes at least component 'C2' 122. Application '2' 120 manages persistency with corresponding persistency 'P2' 124. Application '3' 130 is also a composite application that includes at least component 'C3' 132. Application '3' 130 manages persistency with corresponding persistency 'P3' 134. Components 112, 122, and 124 may be micro-services, according to one embodiment.

Applications, or components thereof, may use different or same runtime environments, according to various embodiments. For example, runtime '1' 145 and runtime '1' 155 are of the same type and are used by both application '1' 110 and application '2' 120. In contrast, application '3' is to be run in runtime '2' 165 which can be of different type. Examples of runtime environments that may be used include, but are not limited to, Node.JS, JavaScript, TomEE, Ruby, DART, HTTP server, etc. In one embodiment, upon start or deployment of application '1' 110, component 'C1' 112 of application '1' 110 is run in runtime '1' 145. Similarly, upon start or deployment of application '2' 120 and application '3' 130, component 'C2' 122 of application '2' 120 is run in runtime '1' 155 and component 'C3' 132 of application '3' 130 is run in runtime '1' 155.

In one embodiment, different services or applications are assigned corresponding separate database schemas to prevent clashing of names. Persistency of the services is separated by the different database schemas. Thus, the whole database is partitioned by the separate database schemas. Database schemas are assigned during deployment of applications 110, 120, and 130. For example, upon deployment of application '1' 110, database schema '1' 140 is associated with component 'C1' 112 of application '1' 110. Similarly, upon deployment of application '2' 120, database schema '2' 150 is associated with component 'C2' 122 of application '2' 120 and, upon deployment of application '3' 130, database schema '3' 160 is associated with component 'C3' 132 of application '3' 130. In one embodiment, within the database, a service such as database schema management service (DBSMS) may provide mapping of a service to a corresponding database schema assigned to the deployed component.

Since the micro-services or services may be assigned separate database schemas, the composite applications composed out of those services can require access across the separate database schemas. For example, for a service or composite application to be provided, a number of micro-services may need to be executed, and each of the micro-services may require different database schemas. For example, stored procedures of the composite application may require access to tables or other objects from different database schemas. Therefore, data from different tables across different database schemas may be joined. However, objects in the different database schemas are accessible and visible in the scope of the corresponding database schema but may be required by services assigned different database schema.

Figure 2:
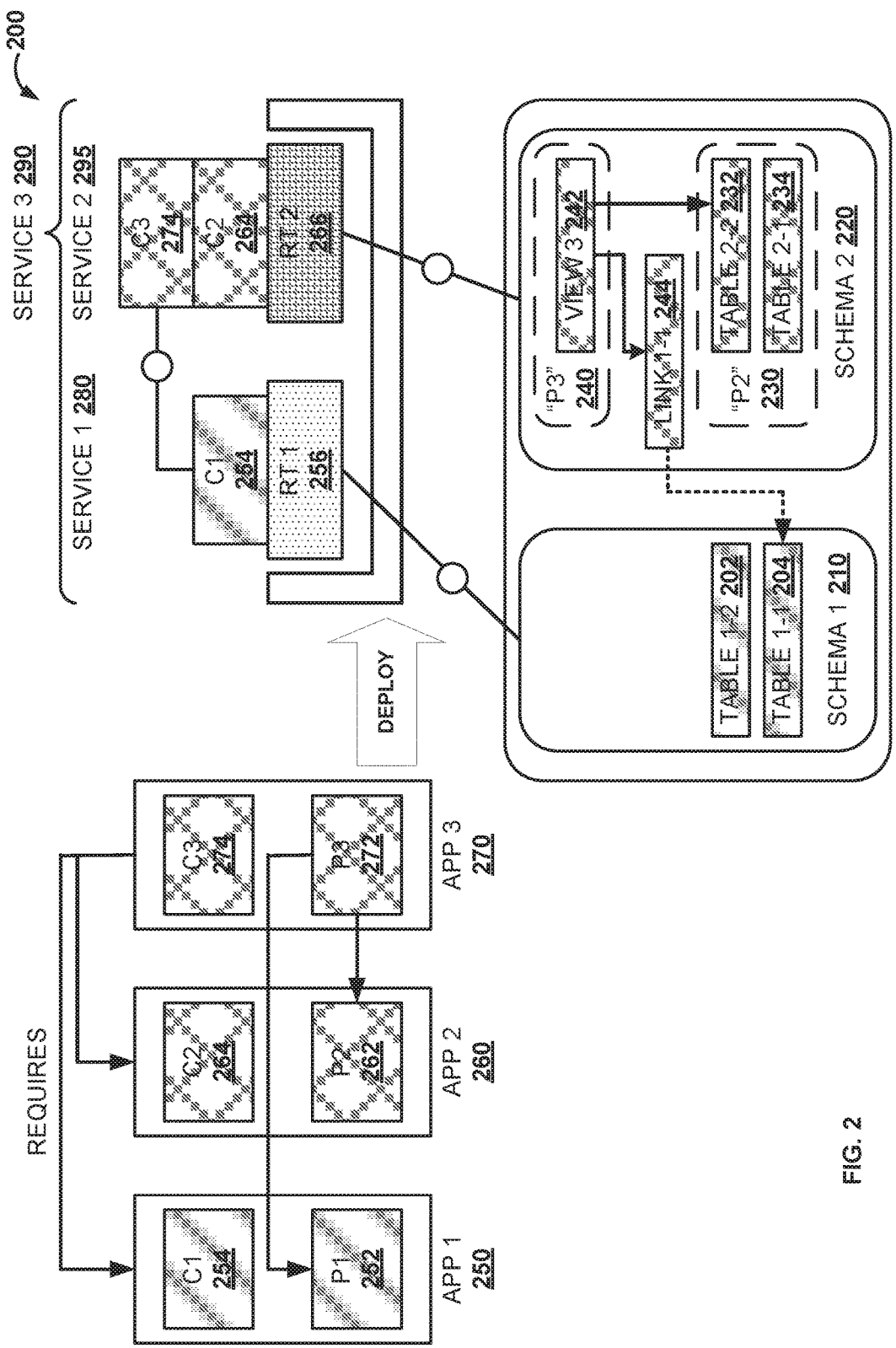
FIG. 2 illustrates cross schema access via a table link, according to one embodiment.

In one embodiment, to join across database schemas table links are created. A table link is a database object that links a table from one database schema to a table from another database schema. For example, a table from a first database schema can be exposed to or punished to a table from a second database schema via a table link (table link is further discusses below). FIG. 2 illustrates cross schema access via a table link, according to one embodiment. Table '1-2' 202 from database schema '1' 210 can be accessed from database schema '2' 220 via table link '1-1' 244. Access to table from different database schemas provides integration on the database layer.

Application '1' 150 includes at least component 'C1' 154. Application '1' 250 further includes persistency package 'P1' 152. Similarly, application '2' 360 includes at least component 'C2' 164 and persistency package 'P2' 162. Application '3' 130 includes at least component 'C3' 274 persistency package 'P3' 272. Component 'C3' 274 from application '1' 150 requires components 'C2' 264 and 'C1' 254. Respectively, an object from persistency 'P3' 272 requires objects from persistency 'P1' 252 and 'P2' 262.

Service '3' 290 is a composite service that includes other services or micro-services such as service '1' 280 and service '2' 295. Service '1' is composed of or includes component 'C1' 254 that is to be run in runtime '1' 256. Service '2' 295 includes component 'C3' 274 which in turn requires component 'C2' 264. Therefore, service '2' 295 further includes component 'C2' 254. Component 'C3' 274 and component 'C2' 254 to be run in the same runtime '2' 266 for service '2' 295. Component 'C3' 274 further requires component 'C1' 254. Accordingly, component 'C3' 274 of service '2' 295 requires component 'C1' 254 from service '1' 280, Thus, service '3' 290 integrates service '1' 280 and service '2' 295.

Upon deployment, schema '1' 210 is created and assigned to service '1' 280. Schema '1' 210 includes table '1-1' 204 and table '1-2' 202. Persistency of service '2' 295 includes, on one hand, persistency 'P3' 240 corresponding to 'P3' 272 from application '3' 270 and, on the other, includes persistency 'P2' 230 corresponding to 'P2' 262 from application '2' 260, according to one embodiment. Persistency 'P2' 230 includes tables '2-1' 234 and '2-2' 232.

In one embodiment, join views may be created that require, use, or refer to tables of different applications and runtimes. Service '3' 290 integrates service '1' 280 and service '2' 295, for example, component 'C3' 274 from service '2' 295 requires component 'C1' from service '1' 280, Accordingly, view '3' 242 may require tables '1-1' 204 from schema '1' 210 of application '1' 250 and table '2-2' 232 from schema '2' 220 of application '2' 260. Since view '3' 242 joins table '1-1' 204 from schema '1' 210 and table '2-2' 232 from schema '2' 220, creation of view '3' 242 depends on tables '1-1' 204 and table '2-2' 232. Tables '1-1' 202 from schema '1' 210 can be exposed to or publish to schema '2' 220 via table link '1-1' 244. Table link '1-1' 244 is created in schema '2' 220 and points to table '1-1' 204 from schema '1' 210.

The data stored in tables '1-1' 204 and '1-2' 202 can be stored in database schema '1' 210, local for tables '1-1' 204 and '1-2' 202 and can be published to foreign schema such schema '2' 220 holding the application code and views (such as view '3' 242) via a table link '1-1' 244. Database views '3' 242 may be a result set of stored queries on the data in the tables '1-1' 204 and in table '2-2' 232, which a server or users can query just as they would in a persistent database collection object.

A table link is a database object, residing in a first (e.g., local) database schema that specifies a set of fields of a corresponding table, residing in a second (e.g., foreign) database schema, where the corresponding table from the second database schema being linked from the first database schema such that the set of fields if a selection or projection on the table being linked. In one embodiment, the set of fields is smaller in number than the original fields of the table which is being linked. For example, table link '1-1' 244 is a projection view to table '1-1' 204. The table link '1-1' 244 may specify a list of fields to be visible during select and update operations from the table '1-1' 204 being linked, according to one embodiment.

According to various embodiments, there can be different types of table links, for example, there can be a table link type for row tables and one for column tables. The name of a table link and the name of the table being linked can differ. In order to allow adding new fields to a table without needing to clone it, a field list can be defined which can be exposed by the table link. In one embodiment, only data fields can be omitted from the field list.

The table link can be a database object type that is either stand alone or it can be an attribute for an existing database view or database synonym/alias. Table links can be created in each database schema '1' 210 and '2' 220 and can be consumed by some or all database objects in the access schema such as calculation views, analytical views, stored procedures, database triggers, database built in functions (e.g., calculation engine functions, etc.) like unit conversion or quantity conversion or calendar functions and other objects.

If the table being linked is extended by new fields, the table link does not propagate this change to the consuming application, service, or micro-service. The consuming application, service, or micro-service is thus de-coupled from the changes in the application, service or micro-service being consumed.

Assigning separate database schemas, removes the need to provide name spaces for database artifacts or other objects to prevent naming collisions. But if tables or other database artifacts are accessed in a view or procedure, which are residing in a different schema, they have to be specified with the schema name, for example, <schema name>.<table name>. This may require that database schema names to be hardcoded in the views or procedures. However, since database schemas are assigned during deployment, names of the database schemas may to be defined flexibly and dynamically and as such can be different in the different deployments or installations. Typically the schema name may include a character sequence specifying the system identifier such SID, and the different systems at the customer may be with different SIDs. A development team may create database views that refer to the tables from the different schemas and another team may create the names of the database schemas during deployment, for example, based on a system identifier. This may create difficulties since views defined using tables in other schemas need to be flexible such that the schema can be named differently at each installation or deployment. For example, if the schema name is hardcoded in the views or procedures, each deployment to change the schema names in the views or procedures, the code in the views or procedures need to be scanned, parsed, and the corresponding schema name replaced with the one specified, for example, by a customer during deployment. Thus, to provide the flexibility of dynamic schema name generation during deployment, referring to the name of the database schema should be avoided. To avoid hardcoding database schema names in the views or procedures and to allow dynamic generation of the schema names upon deployment, table links are used according to one embodiment. Views or procedures instead of including or referring to a database schema name, includes a table link that refers to the table from the foreign schema. In other words, schema names are substituted with table links. Thus, access to tables from different schema is implemented via a table link exposing table from foreign schema to a local schema, not by creating join views which use schema names. In various embodiments, alternative to table links may be database objects such as Structured Query Language (SQL) view or synonym.

Tables from local schemas can be exposed using table links to the foreign schemas. Table '1-1' 202, local for service '1' 280 and schema '1' 210 to be provided for join operations with tables of external components such as component '3' of service '2' 295. Table '1-1' 202 may be declared as consumable by the application '1' 250, owning table '1-2' 202. Tables may be defined to be accessible by other components or services, according to various embodiments. For example, table metadata may specify whether a table is exposed, published and consumable by external components of other services with different persistency and schemas. In one embodiment, the access type of the table being exposed may be specified, for example, access of type "read" or "write" access. Further, service metadata may specify which foreign tables from foreign database schemas are required. The component that may require the foreign tables may be specified. In one embodiment, the access type of the table being linked or consumed may be specified, for example, access of type "read" or "write" access. The service metadata can be read during deployment, but also during deployment of another application or service later. The service metadata thus may be persisted with the service in the database.

According to various embodiments, deployment may be orchestrated explicitly or implicitly. For example, deployment may be orchestrated explicitly by a deploy tool or script that creates the persistency for the application to be deployed including schema, tables and other database objects. Alternatively, deployment may be orchestrated implicitly, for example, when upon startup of the application, the database persistency for the application is created. For example, when upon start of an application, the application detects that required table have not been created yet.

Figure 3:
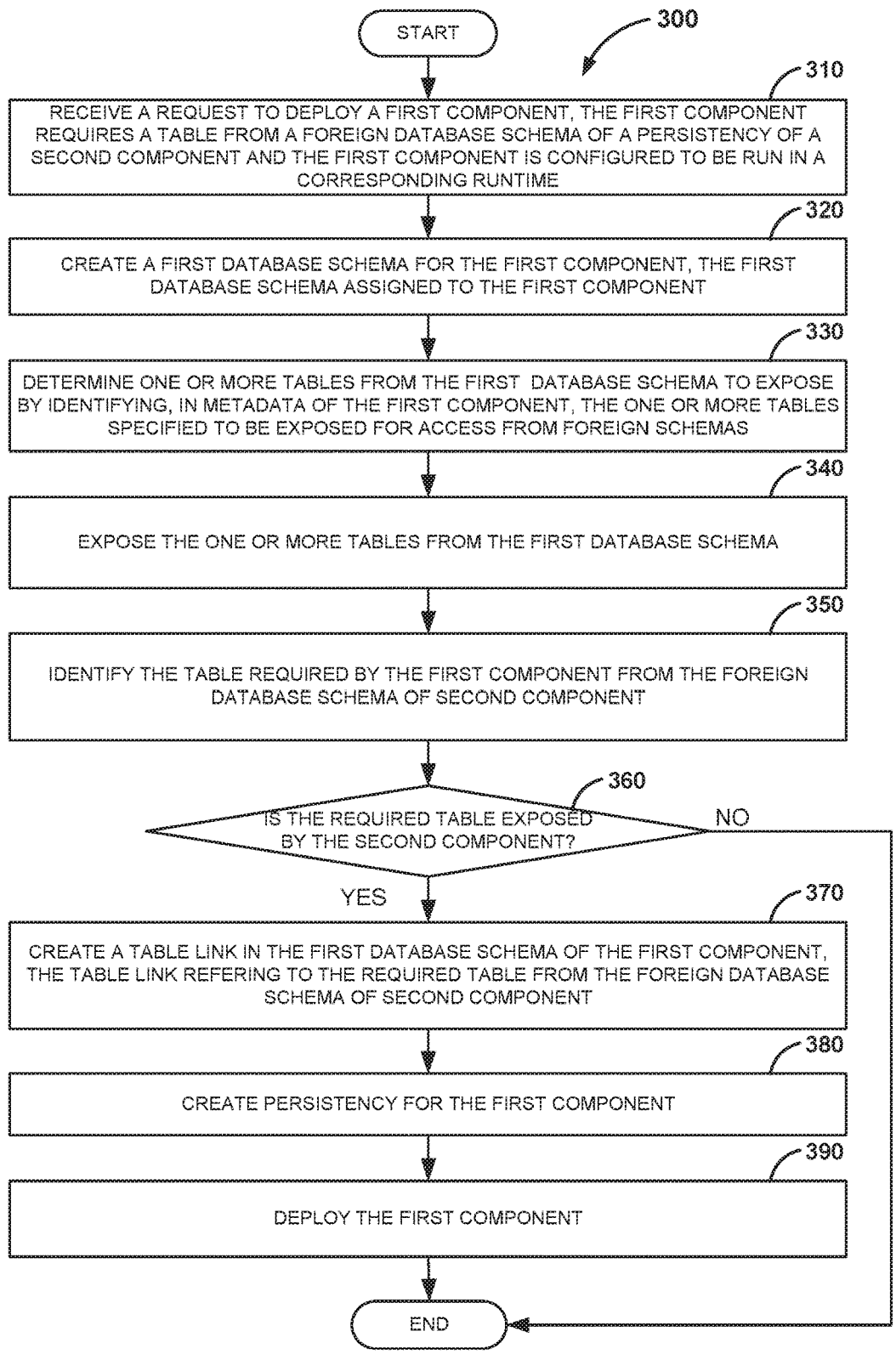
FIG. 3 illustrates a process to orchestrate an explicit deployment of a first component requiring table from a persistency of a second component, according to one embodiment.

FIG. 3 illustrates process 300 to orchestrate explicit deployment of a first component requiring a table from a persistency of a second component, according to one embodiment. Process 300 creates persistency for the first component to be deployed. At 310, a request to deploy the first component is received. The first component is configured to be deployed and run in a corresponding runtime. For example, a deploy tool may be configured to deploy component 'A' into corresponding runtime for component 'A'.

In the original micro-service architecture, the components, services or micro-services, respectively, have independent lifecycle. For example, deployment of one component originally does not depend on the deployment of another component. Similarly, startup of one component originally does not depend on the startup of another component. However, to push calculation to the in-memory database, different services access data from different tables of different database schemas in the database instead of accessing data from the same tables. For views or stored procedures, access across different database schemas, creates dependencies during deployment. For example, the first component requires a table from a foreign database schema of a persistency of a second component, according to one embodiment.

In one embodiment, the deploy tool may call a database schema management service (DBSMS) to create a database schema for the first component to be deployed. At 320, a first database schema for the first component is created. The first database schema is assigned to the first component. In one embodiment, the DBSMS stores the name of the first database schema and the name of the first component for later queries. In one embodiment, the deploy tool may call the DBSMS to expose one or more table from the first database schema. At 330, one or more tables from the first database schema are determined to be exposed. For example, in metadata of the first component, the one of more tables are specified to be exposed for access from external or foreign database schemas. At 340, the one or more tables from the first database schema are exposed or published for other components or services. For example, metadata of the first component is passed to DBSMS to parse the metadata. The DBSMS determines one or more tables that are to be exposed for foreign access and also determines the type of access being allowed. For example, whether a read or a write access is to be provided for the one or more tables. The DBSMS may store names of the one or more tables exposed by the first component, the name of the first database schema, together with information specifying the type of access granted.

At 350, the table required by the first component from the foreign databases schema is identified by reading metadata of the first component. In one embodiment, the deploy tool may call the DBSMS to create table links for the required table of the second component. In one embodiment, name of the second component, including a version, may be passed to DBSMS. The DBSMS may search in the database for a database schema holding the second component. The foreign database schema of the second component is identified as storing the required table and name of the foreign database schema is provided by DBSMS.

At 360, it is checked whether the required table is exposed by the second component providing the required table. If the table is being exposed by the second component, at 370, a table link in the first database schema is created. The table link refers to or links the required table from the foreign database schema of the second component. At 380, persistency for the first component is created. For example, views and stored procedures that may depend on the table link may be generated. Upon creation the persistency of the first component, persistency of the second component may also be created. Creation of the persistency of the first component and the persistency of the second component may is performed prior to startup of the first and the second component, according to one embodiment.

Figure 4:
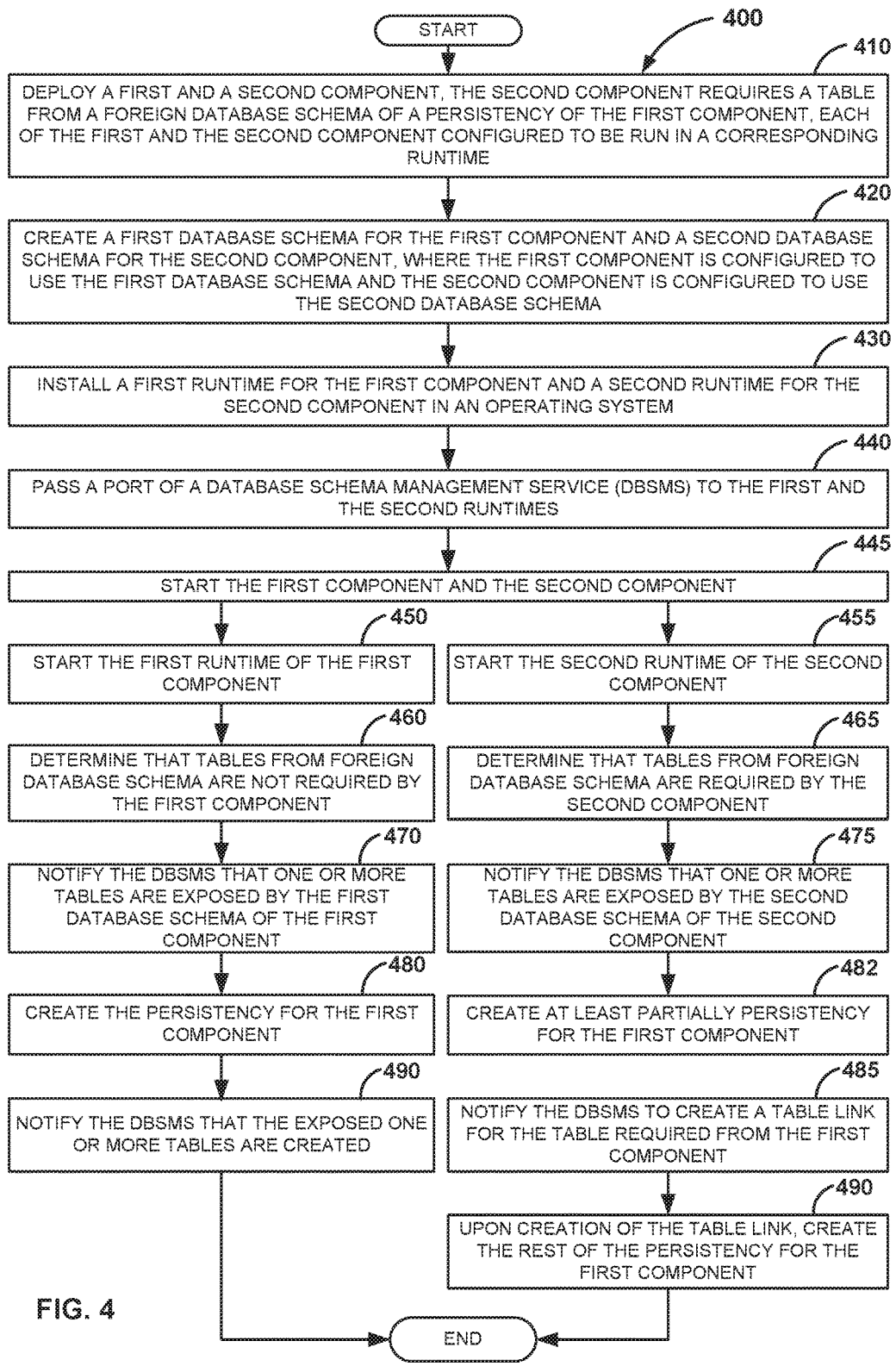
FIG. 4 illustrates a process to orchestrate an implicit deployment of a first component and a second component requiring a table from a persistency of the first component, according to one embodiment.

Similarly to deployment, startup of one service or component originally does not depend on the startup of another component in the original micro-service architecture. However, access across different database schemas creates dependencies during startup of a composite application (or a service) composed of multiple micro-services. FIG. 4 illustrates process 400 to orchestrate an implicit deployment of a first component and a second component, the second component requires a table from a persistency of the first component, according to one embodiment. At 410, a first component and a second component are deployed. The second component requires a table from a foreign persistency of the first component. Further, each of the first and the second component are configured to be run in a corresponding runtime. At 420, a first database schema for the first component and a second database schema for the second component are created. The first component is configured to use the created first database schema and the second component is configured to use the created second database schema. At 430, a first runtime for the first component and a second runtime for the second component are installed including content for the first and the second component, according to one embodiment. The first and the second runtime installed in an operating system of a computer system, where the first and second components are to be run. At 440, a port of a database schema management service is passed to the first runtime and the second runtime. Thus, the first runtime and the second runtime may communicate with the DBSMS. When the startup is configured to manage persistency of the first and the second component, at 445, the first component and the second component are started prior creation of the persistency.

Once the first and the second component are started, at 450 and 455, the first runtime of the first component and the second runtime of the second component are created, respectively. In various embodiment, a deploy tool may start the first and the second component in "run-level 1", on which level persistency is created. In one embodiment, steps 450, 460, 470, 480, and 490 that represent startup for the first component run in parallel to steps 455, 465, 475, 482, 485, and 490 that represent startup for the second component. Thus, creation of persistency for the first component is managed in parallel to creation of persistency of the second component. Upon starting the first runtime of the first component, identifying that database changes are required. At 460, it is determined that tables from foreign database schemas are not required by the first component. At 470, the DBSMS is notified by the first runtime that one or more tables are exposed by the first component. At 480, the persistency for the first component is created. At 490, the DBSMS is notified that the exposed one or more tables are created.

Upon starting the second runtime of the second component, identifying that database changes are required. At 465, it is determined that foreign tables from foreign database schema are required by the second component, according to one embodiment. At 475, the DBSMS is notified that one or more tables are exposed by the second database schema of the second component. At 482, at least partially persistency for the second component is created. For example, database object that without dependencies to components external to the second database schema are created. At 485, the DBSMS is notified to create a table link for the table required from the first component. The DBSMS waits until the required table is created in the first runtime in the first component, in case the required tables have not been generated yet by the parallel startup process fig the first component. Once the required table is created, the table link is also created and the DBSMS is notified that the table link is created. Upon creation of the table link, at 490, the rest of the persistency for the second component is created. For example, views, stored, procedures and other database objects that depend on the table link may be created.

The creation of the persistency of the first component and the second component is thus performed during startup of the first and the second component. Further, the first component may be switched to runtime mode while the second component is still preparing its corresponding persistency. Alternatively, the second component may be switched to runtime mode while the first component is still preparing its corresponding persistency, A component may comprise a package including source code representing the component's logic and a persistency package including database schemas and other database objects. Composite applications comprise a number of components. The number of components may be combined in various services. FIGS. 5-8 illustrate deployment orchestration for various combinations of services integrated on the database level.

FIG. 5 illustrates deployment of application '1' 510 and application '2' 520 to provide service '1' 530 and service '2' 540, where service '1' 530 and service '2' 540 are decoupled, according to one embodiment. Service '1' 530 comprises code package 'C1' 512 and persistency package 'P1' 514. Service '2' 540 comprises code package 'C2' 522 and persistency package 'P2' 524. There are no dependencies of database objects of service '1' 530 and service '2' 540. Thus, deployment is independent and can be performed both explicitly and implicitly during startup. For explicit deployment, each of code package 'C1' 512 and code package 'C2' 522 are built into a corresponding droplet and run into a runtime 535 and runtime 545, respectively. Further, each of persistency package 'P1' 514 and persistency package 'P2' 524 are built separately from the corresponding droplets for code package 'C1' 512 and code package 'C2' 522. During the deployment, schema '1' 550 is created and assigned to service '1' 530 and schema '2' 540 is created and assigned to service '2' 540. For implicit deployment during startup, persistency packages are included in the code packages droplets. For example, code package 'C1' 512 and persistency package 'P1' 514 are built into one droplet and code package 'C2' 522 and persistency package 'P2' 524 are built into another droplet.

Figure 6:
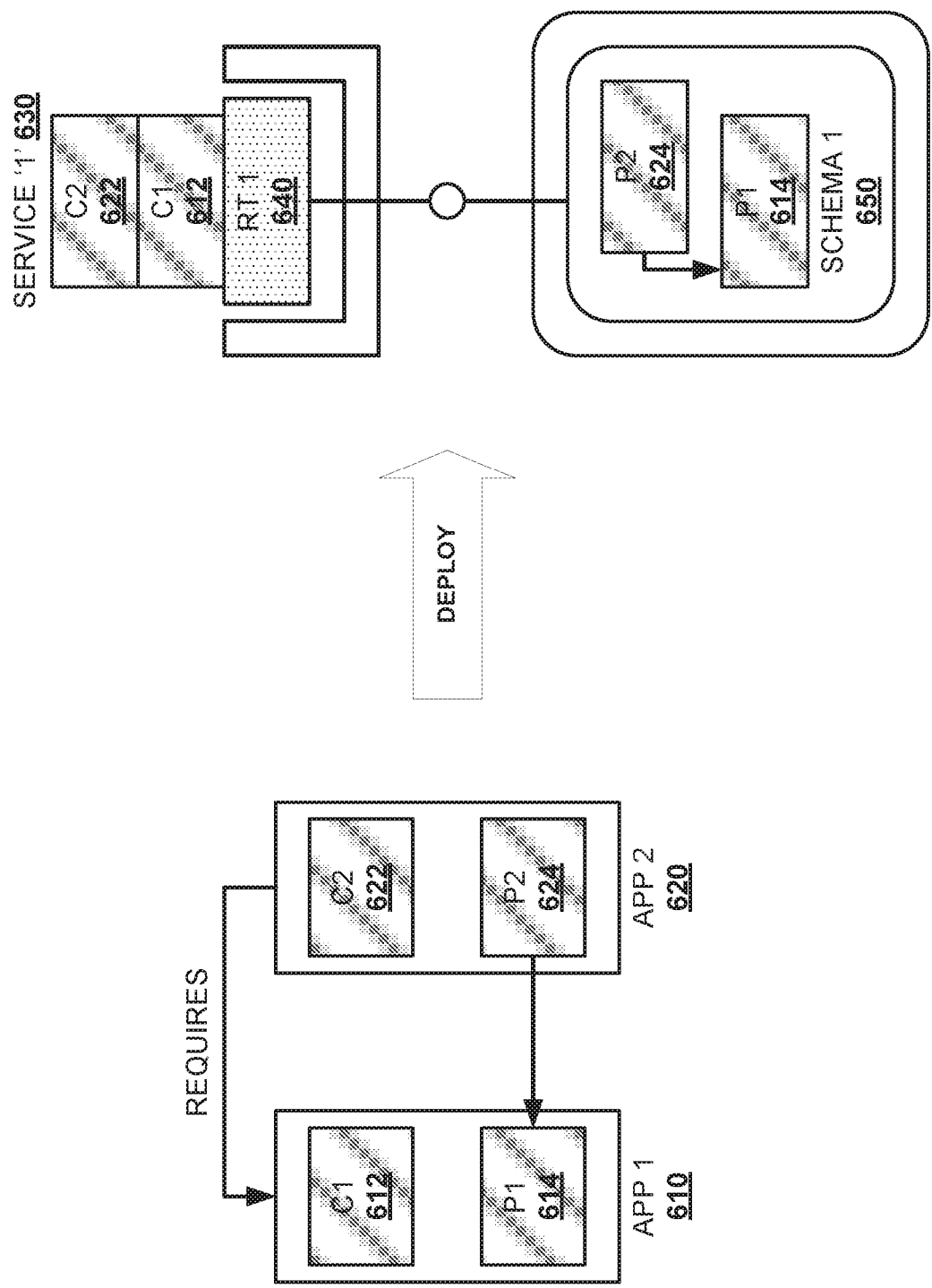

FIG. 6 illustrates deployment of application '1' 610 and application '2' 620 to provide service '1' 630, where service '1' 630 integrates component 'C1' 612 of application '1' 610 with component 'C2' 622 and persistency 'P1' 614 with persistency 'P2' 624, respectively, according to one embodiment. Service '1' 630 comprises code package 'C1' 612, code package 'C2' 622, persistency package 'P1' 614 and persistency package 'P2' 624. Component 'C2' 622 has a runtime dependency on component 'C1' 612. Thus, persistency 'P2' 624 has a deployment dependency on persistency 'P1' 614. For explicit deployment, code package 'C1' 612 and code package 'C2' 622 are built into a single droplet and run into a runtime 640. Further, each of persistency package 'P1' 614 and persistency package 'P2' 624 are built separately from the droplet for code package 'C1' 612 and code package 'C2' 622. During the deployment, schema '1' 650 is created and assigned to service '1' 630. For implicit deployment during startup, persistency packages are included in the code packages droplet. For example, code package 'C1' 612, persistency package 'P1' 614, code package 'C2' 622, and persistency package 'P2' 624 are built into single droplet. Thus, deployment of application '2' 620 depends on deployment of application '1' 610, but it can be managed within one startup process of the single droplet.

FIG. 7 illustrates deployment of application '1' 710, application '2' 720, and application '3' 730 to provide service '1' 740, service '2' 750, and service '3' 760, where service '3' 760 integrates service '1' 740 with service '2' 750. Further, service '2' 750 integrates component 'C2' 722 of application '2' 720 with component 'C3' 732. Component 'C3' 732 has runtime dependency on component 'C1' 712 and component 'C2' 722. Persistency 'P3' 734 has a deployment dependency on persistency 'P2' 724 and persistency 'P3' 734, according to one embodiment. Service '1' 740 comprises code package 'C1' 712 and persistency package 'P1' 714. Service '2' 750 comprises code package 'C2' 722, code package 'C3' 732, persistency package 'P2' 724, and persistency package 'P3' 734.

For explicit deployment, the process first deploys persistency package 'P1' 714 by which schema '1' 770 is created. Then, deploys persistency package 'P2' 724 and 'P3' 724 either together or separately to the deployment of package 'P1' 714. This step creates schema '2' 780. Next, code package 'C1' 712 is deployed. Afterwards, code package 'C2' 722 and code package 'C3' 732 are deployed. The process continues with starting component 'C1' 712 into runtime '1' 745. Then, starting component 'C2' 722 and 'C3' 732 are started and run into runtime '2' 755, either after the start of component 'C1' 712 or in parallel to it.

For implicit deployment during startup, the process starts with deployment of component 'C1' 712 and persistency 'P1' 714, where during the deployment persistency changes may be performed such as creating schema '1' 770. Then, components 'C2' 722 and 'C3' 732 and persistency 'P2' and 'P3' 724 are deployed, either in parallel to the deployment of component 'C1' 712 and persistency 'P1' 714 or separately afterwards. During the deployment persistency changes may be performed such as creating schema '2' 780. The process continues with starting component 'C1' 712 into runtime '1' 745, where persistency changes may be performed, where table links and views may be created for example. Next, the process continues with starting components 'C2' 722 and 'C3' 732, and persistency 'P2' 724 and 'P3' 724, where this step is not complete until the prior step is finished. Next, component 'C1' 712 and persistency 'P1' 714 are run in the next level, where service '1' 74 is started. Similarly, components 'C2' 722 and 'C3' 732, and persistency 'P2' 724 and 'P3' 724 are run in the next level, where service '2' 750 and service '3' 760 are started. Thus, orchestration of the startup of components 'C1' 712, 'C2' 722 and 'C3' 732 is performed along the dependencies. For example, startup of 'C1' 712 and persistency 'P1' should be completed, at least one the first running level, prior to startup of components 'C2' 722 and 'C3' 732 and persistency 'P2' 724 and 'P3' 724.

Figure 8:
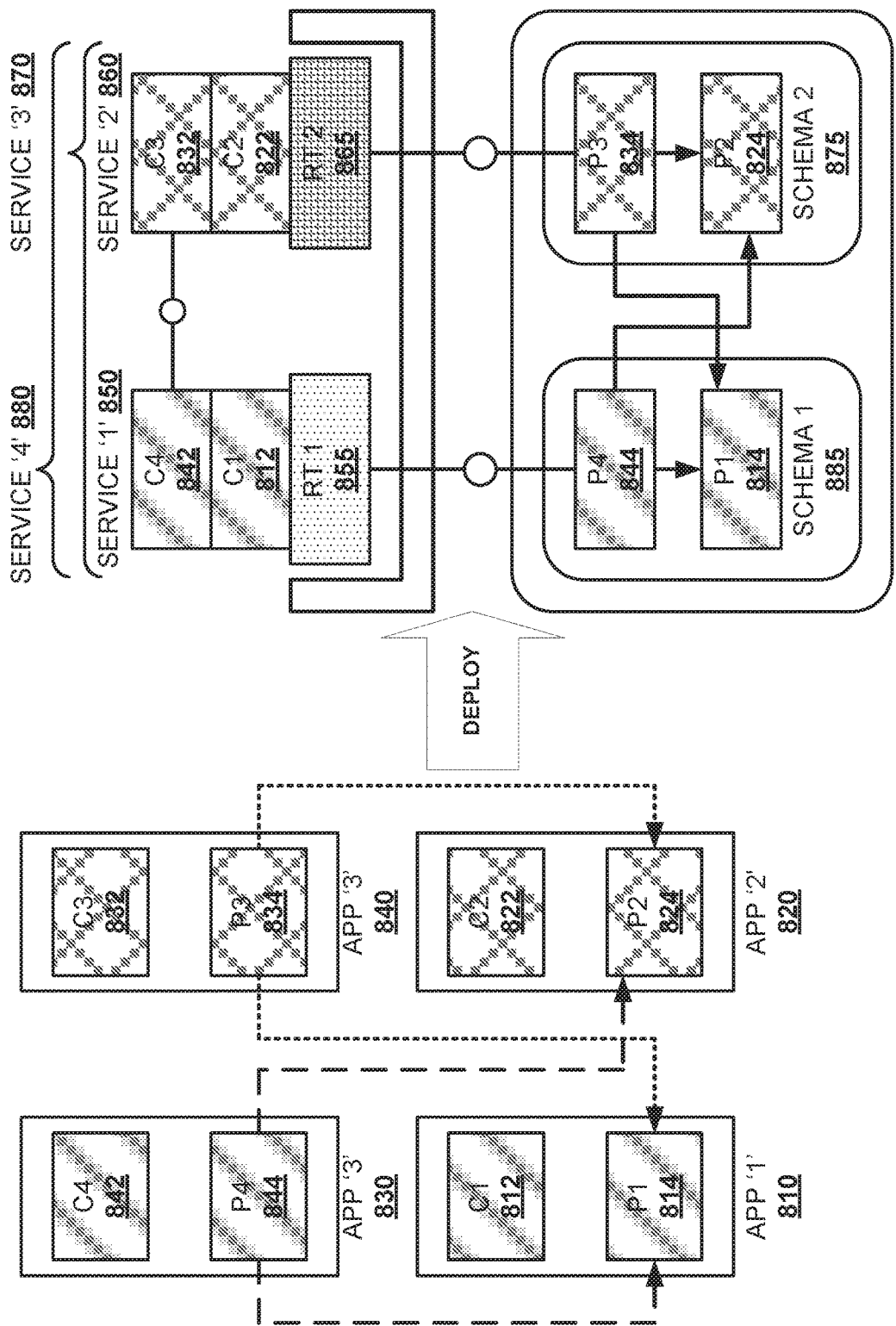

FIG. 8 illustrates deployment of application '1' 810, application '2' 820, application '3' 830, and application '4' 840 to provide service '1' 850, service '2' 860, service '3' 760, and service '4' 880, where both service '3' 870 and service '4' 880 integrate service '1' 850 with service '2' 860. Further, service '1' 850 integrates component 'C1' 812 of application '1' 810 with component 'C4' 842 of application '4' 840 and service '2' 860 integrates component 'C2' 822 of application '2' 820 with component 'C3' 832 of application '3' 830. Component 'C3' 832 has runtime dependency on component 'C1' 812 and component 'C2' 822. Accordingly, persistency 'P3' 834 has a deployment dependency on persistency 'P2' 824 and persistency 'P3' 834. Component 'C4' 842 has runtime dependency on component 'C1' 812 and component 'C2' 822. Accordingly, persistency 'P4' 844 has a deployment dependency on persistency 'P' 824 and persistency 'P3' 834. Service '1' 850 comprises code package 'C1' 812, persistency package 'P1' 814, code package 'C4' 842, and persistency package 'P4' 844. Service '2' 860 comprises code package 'C2' 822, persistency package 'P2' 824, code package 'C3' 842, and persistency package 'P3' 834.

The explicit deployment process (as per FIG. 3) first deploys persistency package 'P1' 814, by which schema '1' 885 may be created. Then, persistency package 'P2' 824 is deployed. Next, persistency 'P3' 834 is deployed, separately from the deployment of package 'P2' 824. This step may create schema '2' 875. Finally, persistency 'P4' 844 is deployed, separately from the deployment of package 'P3' 834. Next, code package 'C1' 812 is deployed together with code package 'C4' 844. Then, code package 'C2' 822 together with code package 'C3' 834 are deployed. The process continues with starting component 'C1' 812 and 'C4' 844 into runtime '1' 855. Then, starting component 'C2' 722 and 'C3' 732 are started and run into runtime '2' 865, either after the start of component 'C1' 712 'C1' 812 and 'C4' 844 or in parallel.

For implicit deployment during startup, the process starts with deployment of components 'C1' 712 and 'C4' 844 and persistency 'P1' 714 and 'P4' 844, where during the deployment persistency changes may be performed such as creating schema '1' 885. Then, components 'C2' 822 and 'C3' 832 and persistency 'P2' 824 and 'P3' 824 are deployed, either in parallel to the deployment of component 'C1' 812, 'C4' 844 and persistency 'P1' 814 and 'P4' 844 or separately afterwards. During the deployment persistency changes may be performed such as creating schema '2' 875.

The process continues with stalling, at a first running level, component 'C1' 712, 'C4' 844 into runtime '1' 745, and persistency 'P1' 814 and 'P4' 844, where persistency changes may be performed for persistency 'P1' 814, where table links and views may be created for example. Next, the process continues with starting, at a first running components 'C2' 722 and 'C3' 732, and persistency 'P2' 724 and 'P3' 724, where persistency changes may be completed upon completing the prior step. Next, component 'C1' 712, 'C4' 844 and persistency 'P1' 714 and 'P4' 844 are run in the next level whereby persistency changes for 'P1' 814 may be performed. Similarly, components 'C2' 722 and 'C3' 732, and persistency 'P2' 724 and 'P3' 724 are run in the next level whereby persistency changes for 'P2' 824 may be performed. Finally, component 'C1' 812, 'C4' 844 and persistency 'P1' 814, 'P4' 844 are run in the next level, where service '1' 850 may be started. Similarly, components 'C2' 722 and 'C3' 732, and persistency 'P2' 724 and 'P3' 724 are run in the next level, where service '2' 750 may be started.

Figure 9:
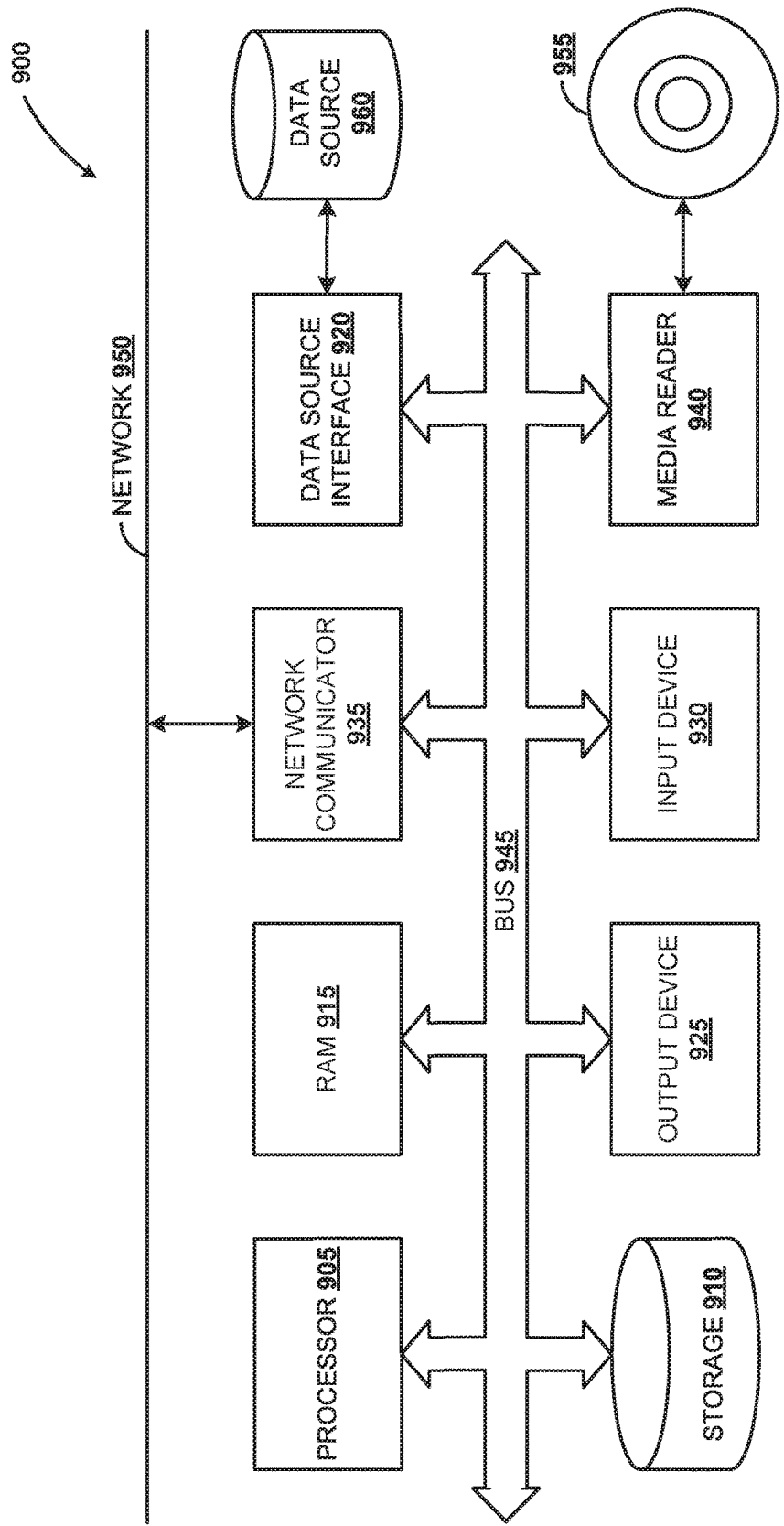
FIG. 9 illustrates an exemplary computer system, according to one embodiment.

FIG. 9 is a block diagram of an exemplary computer system 900. The computer system 900 includes a processor 905 that executes software instructions or code stored on a computer readable storage medium 955 to perform the above-illustrated methods. The processor 905 can include a plurality of cores. The computer system 900 includes a media reader 940 to read the instructions from the computer readable storage medium 955 and store the instructions in storage 910 or in random access memory (RAM) 915. The storage 910 provides a large space for keeping static data where at least some instructions could be stored for later execution. According to some embodiments, such as some in-memory computing system embodiments, the RAM 915 can have sufficient storage capacity to store much of the data required for processing in the RAM 915 instead of in the storage 910. In some embodiments, the data required for processing may be stored in the RAM 915. The stored instructions may be further compiled to generate other representations of the instructions and dynamically stored in the RAM 915. The processor 905 reads instructions from the RAM 915 and performs actions as instructed. According to one embodiment, the computer system 900 further includes an output device 925 (e.g., a display) to provide at least some of the results of the execution as output including, but not limited to Visual information to users and an input device 930 to provide a user or another device with means for entering data and/or otherwise interact with the computer system 900. These output devices 925 and input devices 930 could be joined by one or more additional peripherals to further expand the capabilities of the computer system 900. A network communicator 935 may be provided to connect the computer system 900 to a network 950 and in turn to other devices connected to the network 950 including other clients, servers, data stores, and interfaces, for instance. The modules of the computer system 900 are interconnected via a bus 945. Computer system 900 includes a data source interface 920 to access data source 960. The data source 960 can be accessed via one or more abstraction layers implemented in hardware or software. For example, the data source 960 may be accessed by network 950. In some embodiments the data source 960 may be accessed via an abstraction layer, such as, a semantic layer.

A data source is an information resource. Data sources include sources of data that enable data storage and retrieval. Data sources may include databases, such as, relational, transactional, hierarchical, multi-dimensional (e.g., OLAP), object oriented databases, and the like. Further data sources include tabular data (e.g., spreadsheets, delimited text files), data tagged with a markup language (e.g., XML data), transactional data, unstructured data (e.g., text files, screen scrapings), hierarchical data (e.g., data in a file system, XML data), files, a plurality of reports, and any other data source accessible through an established protocol, such as, Open Data Base Connectivity (ODBC), produced by an underlying software system (e.g., ERP system), and the like. Data sources may also include a data source where the data is not tangibly stored or otherwise ephemeral such as data streams, broadcast data, and the like. These data sources can include associated data foundations, semantic layers, management systems, security systems and so on.

In the above description, numerous specific details are set forth to provide a thorough understanding of embodiments. One skilled in the relevant art will recognize, however that the embodiments can be practiced without one or more of the specific details or with other methods, components, techniques, etc. In other instances, well-known operations or structures are not shown or described in details.

Although the processes illustrated and described herein include series of steps, it will be appreciated that the different embodiments are not limited by the illustrated ordering of steps, as some steps may occur in different orders, some concurrently with other steps apart from that shown and described herein. In addition, not all illustrated steps may be required to implement a methodology in accordance with the one or more embodiments. Moreover, it will be appreciated that the processes may be implemented in association with the apparatus and systems illustrated and described herein as well as in association with other systems not illustrated.

The above descriptions and illustrations of embodiments, including what is described in the Abstract, is not intended to be exhaustive or to limit the one or more embodiments to the precise forms disclosed. While specific embodiments and examples are described herein for illustrative purposes, various equivalent modifications are possible, as those skilled in the relevant art will recognize. These modifications can be made in light of the above detailed description. Rather, the scope is to be determined by the following claims, which are to be interpreted in accordance with established doctrines of claim construction.

What is claimed is:

1. A computer system to integrate persistency of multiple components deployed in different database schemas, comprising:
    a memory to store a program code;
    a processor communicatively coupled to the memory, the processor configured to execute the program code, to:
        upon deploying a first component from a plurality of components, create a first persistency of the first component assigned to a first database schema;
        upon deploying a second component from the plurality of components, create a second persistency of the second component assigned to a second database schema, wherein the first persistency is in a decoupled state from the second persistency;
        read metadata of the first component to identify one or more first required tables required by the first component from the second database schema;
        read metadata of the second component to identify one or more second required tables required by the second component from the first database schema;
        create a first table link database object residing in the first database schema and a second table link database object residing in the second database schema, wherein the first table link exposes for access from the first database schema a first set of fields of the one or more first required tables stored in the second database schema, and wherein the second table link exposes for access from the second database schema a second set of fields of the one or more second required tables stored in the first database schema; and
        integrate the first persistency of the first component assigned to the first database schema and the second persistency of the second component assigned to the second database schema, wherein the integration of the first persistency and the second persistency provisions removing name collisions between a plurality of database objects stored in the first database schema and the second database schema.

2. The computer system of claim 1, wherein the first table link and the second table link include a type of access associated with a corresponding exposure of a corresponding components.

3. The computer system of claim 1, wherein the deployed first component is configured to be run in a first runtime environment and the second component is configured to be run in a second runtime environment, wherein the first runtime environment is different from the second runtime environment.

4. The computer system of claim 1, further comprising: based on the integration, create a first database object to join a first table stored in the first database schema with the one or more first required tables stored in the second database schema via the first table link.

5. The computer system of claim 4, wherein the first database schema and the second database schema are associated with an in-memory database.

6. The computer system of claim 1, wherein the first persistency and the second persistency are selected from a group consisting of calculation views, analytical views, stored procedures, database triggers, and database functions.

7. A computer implemented method to integrate persistency of multiple components deployed in different database schemas, comprising:
    upon deploying a first component from a plurality of components, creating a first persistency of the first component assigned to a first database schema;
    upon deploying a second component from the plurality of components, creating a second persistency of the second component assigned to a second database schema, wherein the first persistency is in a decoupled state from the second persistency;
    reading metadata of the first component to identify one or more first required tables required by the first component from the second database schema;
    reading metadata of the second component to identify one or more second required tables required by the second component from the first database schema;
    creating a first table link database object residing in the first database schema and a second table link database object residing in the second database schema, wherein the first table link exposes for access from the first database schema a first set of fields of the one or more first required tables stored in the second database schema, and wherein the second table link exposes for access from the second database schema a second set of fields of the one or more second required tables stored in the first database schema; and
    integrating the first persistency of the first component assigned to the first database schema and the second persistency of the second component assigned to the second database schema, wherein the integration of the first persistency and the second persistency provisions removing name collisions between a plurality of database objects stored in the first database schema and the second database schema.

8. The computer implemented method of claim 7, further comprising: based on the integration, creating a first database object to join a first table stored in the first database schema with the one or more first required tables stored in the second database schema via the first table link.

9. The computer implemented method of claim 7, wherein the first persistency and the second persistency are selected from a group consisting of calculation views, analytical views, stored procedures, database triggers, and database functions.

10. The computer implemented method of claim 7, wherein the first table link and the second table link include a type of access associated with a corresponding exposure of a corresponding components.

11. The computer implemented method of claim 7, wherein the deployed first component is configured to be run in a first runtime environment and the second component is configured to be run in a second runtime environment, wherein the first runtime environment is different from the second runtime environment.

12. The computer implemented method of claim 7, further comprising: based on the integration, create a first database object to join a first table stored in the first database schema with the one or more first required tables stored in the second database schema via the first table link.

13. A non-transitory computer readable medium storing instructions, which when executed by a processor of a computer, cause the computer to perform operations, comprising:
upon deploying a first component from a plurality of components, create a first persistency of the first component assigned to a first database schema;
upon deploying a second component from the plurality of components, create a second persistency of the second component assigned to a second database schema, wherein the first persistency is in a decoupled state from the second persistency;
read metadata of the first component to identify one or more first required tables required by the first component from the second database schema;
read metadata of the second component to identify one or more second required tables required by the second component from the first database schema;
create a first table link database object residing in the first database schema and a second table link database object residing in the second database schema, wherein the first table link exposes for access from the first database schema a first set of fields of the one or more first required tables stored in the second database schema, and wherein the second table link exposes for access from the second database schema a second set of fields of the one or more second required tables stored in the first database schema; and
integrate the first persistency of the first component assigned to the first database schema and the second persistency of the second component assigned to the second database schema, wherein the integration of the first persistency and the second persistency provisions removing name collisions between a plurality of database objects stored in the first database schema and the second database schema.

14. The non-transitory computer readable medium of claim 13, wherein the first table link and the second table link include a type of access associated with a corresponding exposure of a corresponding components.

15. The non-transitory computer readable medium of claim 13, wherein the deployed first component is configured to be run in a first runtime environment and the second component is configured to be run in a second runtime environment, wherein the first runtime environment is different from the second runtime environment.

16. The non-transitory computer readable medium of claim 13, further comprising: based on the integration, create a first database object to join a first table stored in the first database schema with the one or more first required tables stored in the second database schema via the first table link.

* * * * *